United States Patent [19]

Motozawa

[11] Patent Number: 4,927,172
[45] Date of Patent: May 22, 1990

[54] MECHANICAL ACCELERATION SENSOR
[75] Inventor: Yasuki Motozawa, Wako, Japan
[73] Assignee: Honda Giken Kogyo Kabushiki Kaisha, Tokyo, Japan
[21] Appl. No.: 342,836
[22] Filed: Apr. 26, 1989
[30] Foreign Application Priority Data
  Apr. 27, 1988 [JP] Japan ............... 63-102653
[51] Int. Cl.$^5$ ............... B60R 21/32; F42C 1/04
[52] U.S. Cl. ............... 280/734; 180/282; 200/61.50; 102/247
[58] Field of Search ............... 200/61.45 R, 61.48, 200/61.50, 61.53; 116/203; 102/216, 275, 247, 252; 280/734; 180/282; 73/514

[56] References Cited
U.S. PATENT DOCUMENTS

| | | | |
|---|---|---|---|
| 2,018,590 | 10/1935 | Adams | 200/615 |
| 4,167,276 | 9/1979 | Bell et al. | 200/61.53 |
| 4,464,992 | 8/1984 | Bell | 102/275 |
| 4,666,182 | 5/1987 | Breed | 280/734 |

Primary Examiner—David M. Mitchell
Assistant Examiner—Karin Tyson
Attorney, Agent, or Firm—Armstrong, Nikaido, Marmelstein, Kubovcik & Murray

[57] ABSTRACT

A mechanical acceleration sensor includes a housing and a weight which is rotatably supported by the housing. An actuating member for triggering an output device is mounted on an actuating arm which is rotatable in the same direction as the weight and abuts against the weight from one direction. The actuating arm is usually biased by a toggle spring in a direction for abutting against the weight, whereby the weight is held in its inoperative or initial position by the toggle spring. When the weight is rotated against the force of the toggle spring due to an inertial force, the biasing direction of the toggle spring is inverted to rotate the actuating arm away from the weight. The weight may be implemented as a pair of interconnected and spaced weight parts.

9 Claims, 4 Drawing Sheets

MECHANICAL ACCELERATION SENSOR

BACKGROUND OF THE INVENTION

The present invention relates to an acceleration sensor for use with an automotive air bag system or similar occupant protection system and, more particularly, to a mechanical acceleration sensor for sensing an acceleration or a deceleration by using a weight which is movable due to inertia in the event of acceleration or deceleration.

Many of modern motor vehicles are equipped with various implementations for the protection of occupants such as an air bag system. In general, an air bag system causes a bag to inflate in the event of a collision by sensing an impact force applied to a vehicle body, i.e., a deceleration of a vehicle body greater than a predetermined degree. With an air bag system, therefore, it is necessary to use an acceleration sensor which is sensitive to decelerations greater than the a predetermined value.

A predominant type of acceleration sensor available with an air bag system uses a weight which is movable by inertia, as disclosed in Japanese Patent Publication No. 52-13104 (corresponding U.S. Patent Ser. No. 32,090 and British Patent No. 1,312,609) by way of example. In such a mechanical acceleration sensor, the weight is constantly biased by a spring so that it may be usually held in a predetermined position. The weight in turn retains a firing pin or similar actuating member in an inoperative or initial position. When the vehicle body undergoes a deceleration greater than a predetermined value which is representative of a collision, the weight is shifted by a predetermined amount against the action of the spring so as to release the actuating member. Then, the actuating member is driven by a compression spring to impact against a detonator which initiates the expansion of the inflatable bag. It has been customary to cause the weight and actuating member to move linearly along a guide.

A prerequisite with an air bag system is that the system be prevented from being actuated by low-speed collisions, ordinary rapid decelerations, vibrations of a vehicle body which are not derived from a collision, etc. Upon actual collision, however, the system has to be surely triggered. These requirements cannot be satisfied unless the acceleration sensor is capable of operating with accuracy, i.e., unless the displacement of the weight is accurately designed for a predetermined deceleration. Also, the actuating member needs to actuate the system immediately as soon as it is freed from the restraint.

A problem with the prior art acceleration sensor having a weight and an actuating member which are linearly movable is that the weight and actuating member and the guide undergo friction due to their sliding contact. The friction is substantial and, moreover, it varies with the moving speed of the weight and/or that of the actuating member. It is therefore extremely difficult to adequately select the preload of the spring for controlling the movement of the weight and the preload of the spring for driving the actuating member. Another problem with such a prior art acceleration sensor is that the structure is complicated because independent springs are needed for controlling the weight and for driving the actuating member.

SUMMARY OF THE INVENTION

It is therefore an object of the present invention to provide a mechanical acceleration sensor which is operable smoothly.

It is another object of the present invention to provide a mechanical acceleration sensor whose operating conditions are easy to set up.

It is another object of the present invention to provide a mechanical acceleration sensor in which a spring for controlling the movement of a weight and a spring for driving an operating member are implemented as a single spring.

It is another object of the present invention to provide a compact and simple mechanical acceleration sensor.

In order to achieve the above objects, in accordance with the present invention, a weight and an actuating arm are individually rotatably supported so that the weight may rotate when an inertial force is developed therein. The actuating arm is movable out of contact with the weight and is usually held in abutment against the weight by a toggle spring. When the actuating arm is rotated to a predetermined position, the toggle spring urges the actuating arm in the rotating direction of the latter. An actuating member is mounted on the actuating arm to trigger an output device when the arm is rotated to a predetermined position.

In the above construction, the actuating arm is usually maintained in an inoperative or initial position by the force of the toggle spring while being held in engagement with the weight. In response to an acceleration higher than a predetermined degree, the weight is rotated against the action of the toggle spring while entraining the actuating arm. As the actuating arm advances across a neutral position of the toggle spring, the biasing direction of the toggle spring is inverted resulting in the arm being urged in its rotating direction. This causes the actuating arm to rotate rapidly away from the weight so that the operating member impacts against and triggers the output device.

Since the weight and actuating arm are individually rotatable as stated above, the resistance to such motions is almost negligible. The single spring which implements both of the control over the weight and the drive of the actuating arm promotes easy setting and the simplification of the sensor in structure.

The weight and the actuating arm may be commonly supported by a single shaft to reduce the number of structual parts and thereby to further simplify the structure. In this case, the weight and the actuating arm should preferably be engaged with each other at a position which is closer to the center of rotation than to the center of gravity of the weight. Then, since the inertial force of the weight to be applied to the actuating arm is amplified, a toggle spring having a great biasing force can be used to insure the rotation of the actuating arm in the event of operation.

Preferably, the actuating arm is formed sufficiently long and provided with the actuating member at its free end. This allows the actuating member to move over a substantial distance when the actuating arm is rotated. Hence, the actuating member can be located sufficiently remote from the output device in the initial position thereof in order to avoid erroneous operations.

In a preferred embodiment, the weight is implemented as a pair of interconnected weights with the actuating arm being interposed therebetween. Having a channel-like configuration, the actuating arm is supported by a pair of coaxial stub shafts which are spaced from each other. The toggle spring is constituted by a coil spring which is anchored at opposite ends thereof to a housing and the actuating arm at opposite sides with respect to the coaxial stub shafts. The coil spring is disposed between a pair of side plates of the actuating arm and, when the actuating arm is rotated, moves across the axis of rotation of the actuating arm. The coil spring therefore implements an inexpensive toggle spring while rendering the whole sensor construction compact. Further, the opposite weights individually exert a force on the actuating arm to further enhance the smooth operation.

Advantageously, the housing is provided with stops for holding the weight or weights in the initial position against the force of the toggle spring.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
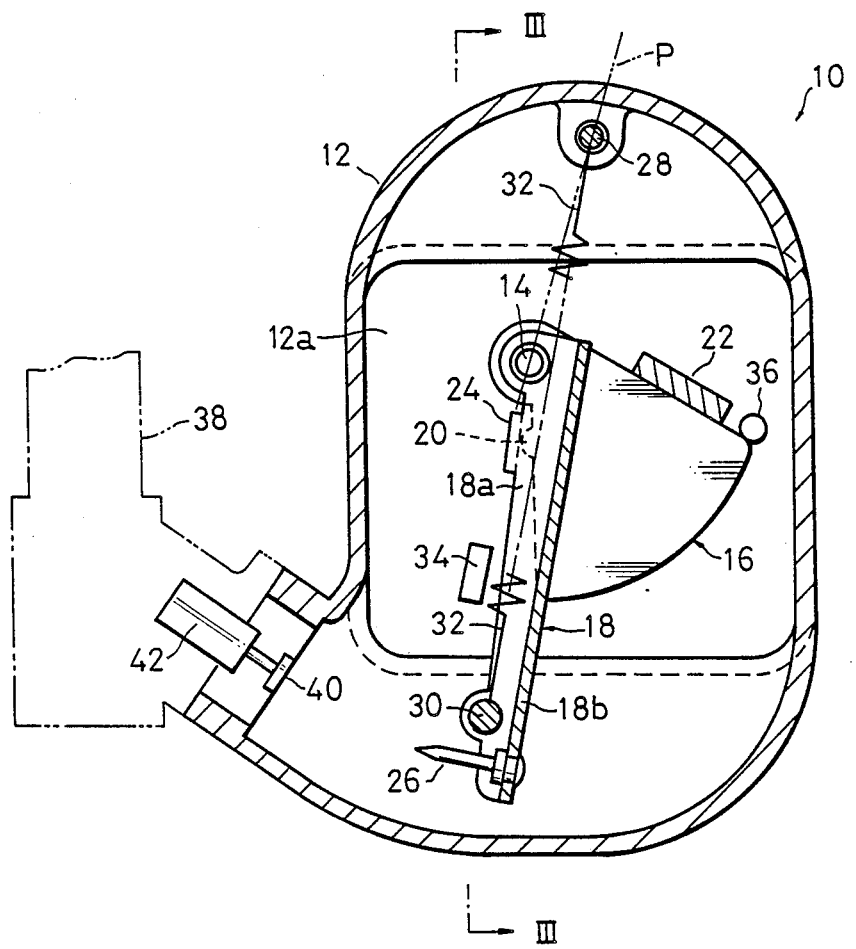
FIG. 1 is a vertical section showing a mechanical acceleration sensor embodying the present invention in an initial condition.
Figure 2:
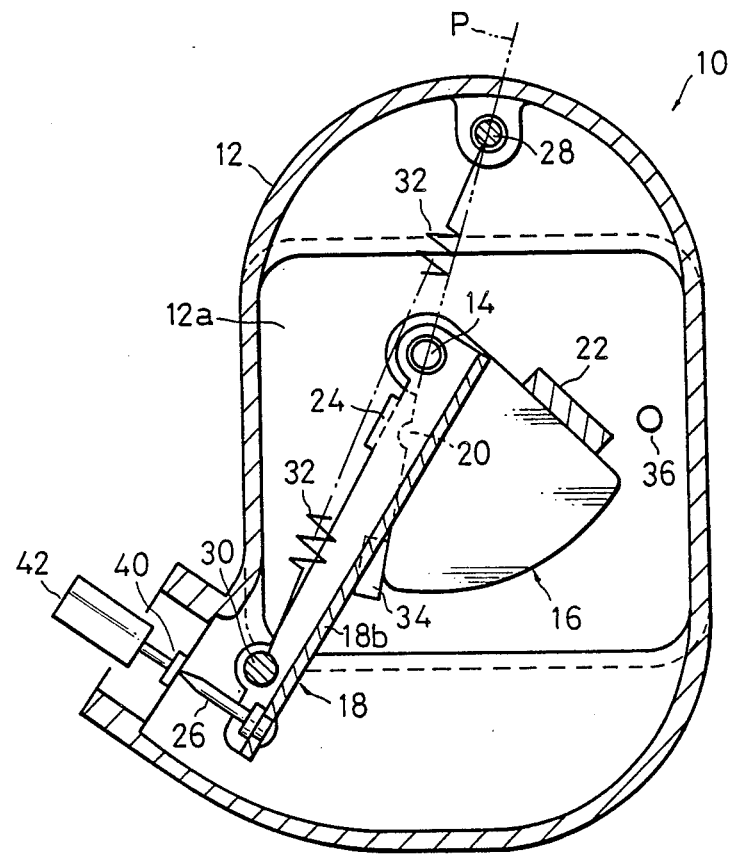
FIG. 2 is a view similar to FIG. 1, showing the acceleration sensor in an operating condition.
Figure 3:
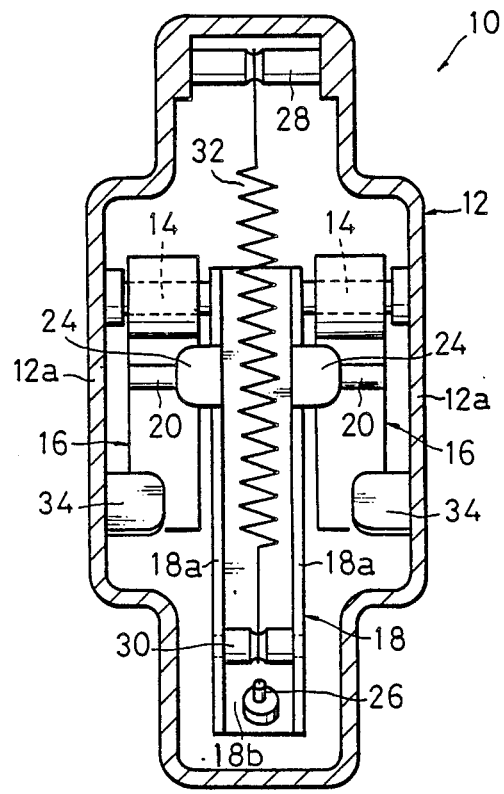
FIG. 3 is a vertical section along line III—III of FIG. 1.
Figure 4:
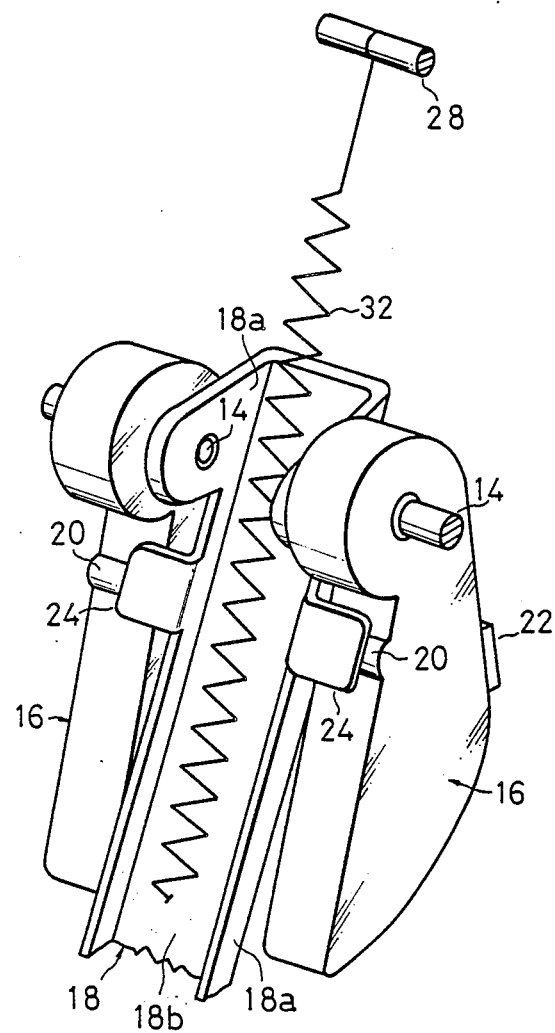
FIG. 4 is a fragmentary perspective view of the acceleration sensor shown in FIG. 1.

Referring to FIGS. 1 to 4, an acceleration sensor embodying the present invention is shown and generally designated by the reference numeral 10. The acceleration sensor 10 has a substantially elliptical box-like housing 12 which is bulged sideways in a central part thereof, as shown in FIG. 3. The housing 12 has spaced side walls 12a. A pair of stub shafts 14 extend from the opposite side walls 12a toward each other in an upper portion of the interior of the housing 12. The stub shafts 14 are coaxial with and spaced apart from each other. A pair of weights 16 are individually supported by the stub shafts 14, while a single actuating arm 18 is also supported by the stub shafts 14.

Specifically, each weight 16 has a substantially sectorial contour which is notched on the left-hand side as viewed in FIG. 1. The weight 16 is rotatably coupled over the associated stub shaft 14 through a bearing at the center of the arc which forms the circumferential edge of the sector. The center of gravity of the weight 16 is therefore spaced apart from the stub shaft 14, i.e., the center of rotation of the weight 16, so that the weight 16 is rotatable about the stub shaft 14 when subjected to an inertial force.

The weights 16 are positioned such that their front ends are located substantially in a plane which contains the axis of the aligned stub shafts 14. A lug 20 extends forward from the front end of each weight 16 and in a portion of the latter which is sufficiently closer to the associated stub shaft 14 than to the center of gravity of the weight 16. The weights 16 each having such a configuration are interconnected by a crossbar 22 at their rear ends.

The actuating arm 18 is interposed between the weights 16 and has a generally front-open channel-like configuration which is defined by a pair of side plates 18a and a bottom plate 18b. Upper end potions of the side plates 18a are individually coupled over the tips of the stub shafts 14 through bearings, whereby the arm 18 is bodily rotatable about the stub shafts 14. Tongues 24 extend outward from the individual side plates 18a of the arm 18 away from each other and in those positions which are associated with the lugs 20 of the weights 16.

In the above construction, the weights 16 and the actuating arm 18 are rotatable about the common axis and, yet, independently of each other. When the arm 18 is rotated rearward toward the weights 16, the tongues 24 are individually brought into abutment against their associated lugs 20 and therefore rotatable integrally with the latter.

The length of the operating arm 18 as measured from the center of rotation to the lower end is sufficiently greater than the dimension of each weight 16 as measured from the center of rotation to the circumferential edge. A firing pin 26 extends forward from a lower end portion of the actuating arm 18.

Pins 28 and 30 are provided in an upper end portion of the housing 12 and a lower end portion of the actuating arm 18, respectively. A coiled tension spring 32 is anchored to the pins 28 and 30 at opposite ends thereof. The spring 32 selectively assumes a position shown in FIG. 1 in which it is accommodated in the channel-like actuating arm 18 and a position shown in FIG. 2 in which it is located outside of the arm 18. The spring 32 moves across the axis of rotation of the arm 18, i.e., the axis of the aligned stub shafts 14 between such two different positions. Hence, the spring 32 biases the arm 18 counterclockwise when located on the right-hand side with respect to a plane P which contains the axis of the pin 28 and that of the stub shafts 14, as viewed in FIG. 1. Conversely, the spring 32 biases the arm 18 clockwise when located on the left-hand side with respect to the plane P. Thus, the spring 32 plays the roles of a toggle spring.

The housing 12 is provided with a pair of stops 34 and a pair of stops 36 for limiting the angular movement of the weights 16. The stops 34 on the front side are positioned such that when the weights 16 are brought into abutment against the stops 34, the toggle spring 32 lies in the plane P which contains the axis of the pin 28 and that of the stub shafts 14 or in a position slightly forward of the plane P. While the weights 16 are held in engagement with the rear stops 36, a moment of rotation acts on each weight 16 clockwise due to gravity.

The air bag system has a power unit 38 which is mounted on the end of the housing 12. The power unit 38 has a detonator 40 which is located on a path along which the firing pin 26 on the actuating arm 18 is movable. More specifically, when the arm 18 is rotated to a predetermined position, the firing pin 26 impacts against the detonator 40 to thereby ignite a propellant 42. In this respect, the power unit 38 and the firing pin 26 serve respectively as an output device and an actuating member of the acceleration sensor 10.

The acceleration sensor 10 having the above construction is mounted on a vehicle body with its left part as viewed in FIG. 1 being located at the front with respect to the longitudinal direction of the vehicle body. As shown in FIG. 1, the tongues 24 of the actuating arm 18 are individually abutted against the lugs 20 of the weights 16, while the rear ends of the weights 16 are abutted against the stops 36. In this condition, the toggle spring 32 is located at the right with respect to the neutral plane P thereof and therefore constantly biases the actuating arm 18 counterclockwise. Hence, so long as the biasing force of the spring 32 is greater than the clockwise rotational force of the weights 16, the arm 18 and weights 16 are individually held in the positions shown in FIG. 1, i.e., inoperative or initial positions.

In operation, when the vehicle body encounters a substantial degree of deceleration, the housing 12 securely mounted on the vehicle body is rapidly decelerated also. However, the weights 16 rotatably supported by the housing 12 tend to move continuously in the running direction of the vehicle body due to inertia, resulting in a clockwise rotational force being developed in the weights 16. This rotational force causes the weights 16 to urge the actuating arm 18. Hence, if the deceleration is greater than a predetermined degree, the actuating arm 18 is rotated clockwise together with the weights 16 against the action of the toggle spring 32.

Once the toggle spring 32 is moved forward beyond the neutral plane P due to the clockwise movement of the actuating arm 18, it urges the arm 18 clockwise. As a result, the arm 18 is rapidly rotated clockwise until the firing pin 26 provided on the arm 18 hits against the detonator 40, as shown in FIG. 2, whereby the power unit 38 is triggered. After the weights 16 have been brought into abutment against their associated stops 34, the actuating arm 18 alone is further driven clockwise by the toggle spring 32.

When the deceleration is lower than the predetermined degree, the weights 16 and actuating arm 18 are maintained in their initial positions by the toggle spring 32. Even when the deceleration is higher than the predetermined degree, the arm 18 does not rotate beyond the neutral plane P of the toggle spring 32 if the duration of such a deceleration is extremely short. In this condition, therefore, the weights 16 and arm 18 are returned to their initial positions by the force of the spring 32. It follows that the air bag system is surely prevented from being initiated by decelerations other than a deceleration ascribable to a collision.

Since the weights 16 and actuating arm 18 are rotatable as stated above, no frictional resistance to their motions occurs except for a negligible degree of frictional resistance which is developed in the bearing portions between the weights 16 and arm 18 and the stub shafts 14. This allows the preload of the spring 32 adapted to control the rotation of the weights 16 to be set with ease. Further, since the motion of the arm 18 is smooth, the acceleration sensor 10 triggers the air bag system instantaneously in response to an impact caused by a collision.

The weights 16 and the arm 18 are engaged with each other at their portions which are close to the center of rotation, i.e., the stub shafts 14. Hence, inertial forces developed in the weights 16 are amplified when applied to the arm 18. For this reason, use can be made of a toggle spring 32 which exerts a great biasing force for preventing the weights 16 from rotating under usual conditions. A toggle spring 32 exerting such a biasing force is successful in causing the arm 18 to move more rapidly in the event of operation. This in turn allows the arm 18 and therefore the firing pin 26 studded thereon to be located at a greater distance from the detonator 40 in the initial condition of the acceleration sensor 10 so as to free the sensor 10 from erroneous operations.

The actuating arm 18 has a substantial length and carries the firing pin 26 at its tip, as stated earlier. The firing pin 26 therefore moves over a substantial distance in response to a small angular movement of the arm 18. This increases not only the moving speed of the firing pin 26 but also the impact force to be exerted by the pin 26 on the detonator 40, thereby guaranteeing a sure operation of the acceleration sensor 10.

Both of the control over the angular movement of the weighs 16 and the drive of the actuating arm 18 are implemented by a single toggle spring 32, so that the acceleration sensor 10 needs only a small number of structural parts and has therefore a simple structure. The toggle spring 32 itself is implemented as an inexpensive and easy-to-mount coil spring which is simply anchored at opposite ends thereof to the upper end of the housing 12 and the lower end of the actuating arm 18 at oppposite sides with respect to the stub shafts 14.

The actuating arm 18 has a channel-like configuration defined by the opposite side plates 18a, and it is supported by the aligned support shafts 14 which are spaced apart from each other by the same distance as the distance between the side plates 18a. The toggle spring 32 implemented as a coil spring is received in the space between the side plates 18a to render the whole acceleration sensor 10 compact. Since the weights 16 are situated at opposite sides of the actuating arm 18 and since the arm 18 is engaged with the weights 16 at opposite sides thereof, the arm 18 does not suffer from localized forces and is therefore movable more smoothly.

The characteristics of the acceleration sensor 10 are adjustable with ease by suitably selecting the position of the stops 36 which define the initial position of the weighs 16 and arm 18, the position of the stub shafts 14 which define the center of rotation of the weights 16 and arm 18, the biasing force of the toggle spring 32, etc. This broadens the design freedom of the acceleration sensor 10.

While the weights 16 and the arm 18 have been shown and described as being supported by the same shafts 14, they may alternatively be supported by independent shafts. The gist is that the weights 16 and the arm 18 be rotatable about parallel or coaxial axes, that the arm 18 be usually held in engagement with the weights 16 to prevent the movement of the weights 16, and that the arm 18 be driven by the weights 16 upon the application of an inertial force to the weights 16. However, supporting the weights 16 and arm 18 by using the same shafts 14 is more preferable considering the required number of structural parts.

The stops 34 and/or the stops 36 may be omitted, if desired. When the stops 34 are absent, the arm 18 will be accelerated by the toggle spring 32 and will therefore be released from the weights 16 when the spring 32 moves beyond the neutral plane P. When the springs 36 are omitted, an arrangement will be made such that the initial positions of the weights 16 and arm 18 are determined by the balance between the rotational force ascribable to the weight of the weights 16 and the biasing force of the toggle spring 32.

The acceleration sensor 10 is usable not only to trigger the power unit 38 of an air bag system as shown and described but also to generate a signal representative of a predetermined acceleration or a predetermined deceleration for use with a preloader system of a seat belt or similar apparatus for vehcle occupant protection.

Various modifications will become possible for those skilled in the art after receiving the teachings of the present disclosure without departing from the scope thereof.

What is claimed is:

1. A mechanical acceleration sensor comprising:
   a housing;
   a weight rotatably supported by said housing;
   an actuating arm rotatable about an axis parallel or coaxial to an axis of rotation of said weight and abutting against said weight when rotated toward said weight;
   a toggle spring preloaded between said actuating arm and said housing for usually biasing said actuating arm in one direction such that said actuating arm abuts against said weight to prevent said weight from rotating and, when said weight is rotated to a predetermined position together with said actuating arm against a biasing force of said toggle spring, urging said actuating arm in a direction opposite to said one direction such that said actuating arm is released from said weight and rotated alone;
   an actuating member mounted on said actuating arm; and
   an output device positioned on a path along which said actuating member is movable and being operated by said actuating member when said actuating arm is rotated to a predetermined position away from said weight.

2. An acceleration sensor as claimed in claim 1, wherein the axis of rotation of said weight and the axis of rotation of said actuating arm are defined by a single axis.

3. An acceleration sensor as claimed in claim 2, wherein said weight and said actuating arm are engaged with each other at a position which is closer to the axis of rotation than to the center of gravity of said weight.

4. An acceleration sensor as claimed in claim 2, wherein a dimension of said actuating arm as measured from a center of rotation to a free end of said actuating arm is sufficiently greater than a dimension of said weight as measured from a center of rotation to a free end of said weight, said actuating member being mounted on said free end of said actuating arm.

5. An acceleration sensor as claimed in claim 1, wherein said toggle spring comprises a coil spring which is anchored at one end to said actuating arm and at the other end to said housing at opposite sides with respect to the axis of rotation of said actuating arm and moves across said axis of rotation of said actuating arm when said actuating arm is rotated.

6. An acceleration sensor as claimed in claim 5, wherein said actuating arm has a channel-like configuration formed by a pair of side plates and a bottom plate and is rotatably supported by a pair of stub shafts which are coaxial with each other and are spaced apart from each other by a distance defined between said side plates, said coil spring being disposed between said side plates.

7. An acceleration sensor as claimed in claim 6, wherein a pair of said weights are individually located at opposite sides of said actuating arm and connected to each other.

8. An acceleration sensor as claimed in claim 1, further comprising stops for holding said weight at an initial position against a force of said toggle spring.

9. An acceleration sensor as claimed in claim 1, wherein said output device comprises a power unit of an air bag system, said actuating member comprising a firing pin for impacting against a detonator which is installed in said power unit.

* * * * *